United States Patent
Slobodyanyuk et al.

(10) Patent No.: US 11,435,440 B2
(45) Date of Patent: Sep. 6, 2022

(54) VEHICLE-TO-EVERYTHING ASSISTED DYNAMIC CALIBRATION OF AUTOMOTIVE SENSORS

(71) Applicant: QUALCOMM Incorporated, San Diego, CA (US)

(72) Inventors: Volodimir Slobodyanyuk, San Diego, CA (US); Mohammed Ataur Shuman, San Diego, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 16/590,091

(22) Filed: Oct. 1, 2019

(65) Prior Publication Data

US 2021/0096215 A1 Apr. 1, 2021

(51) Int. Cl.
| | | |
|---|---|---|
| *G01S 7/40* | (2006.01) | |
| *G08G 1/0967* | (2006.01) | |
| *G01S 13/86* | (2006.01) | |
| *H04L 67/12* | (2022.01) | |
| *H04W 4/38* | (2018.01) | |
| *H04W 4/40* | (2018.01) | |
| *G01S 13/89* | (2006.01) | |
| *G06V 20/56* | (2022.01) | |

(52) U.S. Cl.
CPC .......... *G01S 7/4026* (2013.01); *G01S 13/865* (2013.01); *G01S 13/867* (2013.01); *G01S 13/89* (2013.01); *G06V 20/56* (2022.01); *G08G 1/096783* (2013.01); *H04L 67/12* (2013.01); *H04W 4/38* (2018.02); *H04W 4/40* (2018.02)

(58) Field of Classification Search
CPC ...... G01S 13/865; G01S 13/867; G01S 13/89; G01S 13/931; G01S 2013/9316; G01S 2013/9329; G01S 7/4026; G06V 20/56; G08G 1/096783; H04L 67/12; H04W 4/38; H04W 4/40; H04W 4/44
See application file for complete search history.

(56) References Cited

U.S. PATENT DOCUMENTS

| | | | |
|---|---|---|---|
| 9,830,816 B1* | 11/2017 | Murray | H04B 17/12 |
| 10,466,717 B1* | 11/2019 | Su | G06N 3/08 |
| 2018/0196127 A1* | 7/2018 | Harada | G01S 17/93 |
| 2019/0162820 A1* | 5/2019 | Agarwal | G01S 7/497 |
| 2020/0264275 A1* | 8/2020 | Voorheis | G01S 13/931 |

* cited by examiner

*Primary Examiner* — Timothy X Pham
(74) *Attorney, Agent, or Firm* — Qualcomm Incorporated

(57) ABSTRACT

Methods, systems, and devices for wireless communications are described. A vehicle-based wireless device may receive a calibration availability message from a roadside unit identifying one or more calibration characteristics of a calibration object associated with the roadside unit. The vehicle-based wireless device may determine one or more sensor characteristics for a sensor of the vehicle and the vehicle. The vehicle-based wireless device may measure the one or more calibration characteristics of the calibration object using the sensor while the vehicle is within a defined range of the calibration object. The vehicle-based wireless device may perform a calibration procedure to calibrate the sensor based at least in part on the identified one or more calibration characteristics, the measured one or more calibration characteristics, and the one or more sensor characteristics.

20 Claims, 11 Drawing Sheets

VEHICLE-TO-EVERYTHING ASSISTED DYNAMIC CALIBRATION OF AUTOMOTIVE SENSORS

BACKGROUND

The following relates generally to wireless communications, and more specifically to vehicle-to-everything (V2X) assisted dynamic calibration of automotive sensors.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for vehicle-based communications, also referred to as vehicle-to-everything (V2X) networks, vehicle-to-vehicle (V2V) networks, cellular V2X (CV2X) networks, or other similar networks. Vehicle based communication networks may provide always on telematics where vehicle-based wireless devices, e.g., vehicle UEs (v-UEs), communicate directly to the network (V2N), to pedestrian UEs (V2P), to infrastructure devices (V2I), and to other v-UEs (e.g., via the network and/or directly). The vehicle-based communication networks may support a safe, always-connected driving experience by providing intelligent connectivity where traffic signal/timing, real-time traffic and routing, safety alerts to pedestrians/bicyclist, collision avoidance information, etc., are exchanged. Communications in vehicle-based networks may include transmissions of various safety-related messages (e.g., basic safety message (BSM) transmissions, traveler information message (TIM) transmissions, etc.).

To support advance driver assistance system (ADAS) features, vehicles may be equipped with various sensors, e.g., image-based sensors, proximity and ranging based sensors, location sensors, and the like. The sensors are generally installed and calibrated by the manufacture and/or by an aftermarket installer (e.g., during a repair/replacement). However, the sensors may need to be recalibrated on occasion to ensure/confirm accuracy. For example, in the course of normal vehicle operations, there is a need to maintain confidence that the sensor(s) installed in the vehicle continue to remain calibrated to within an acceptable tolerance range. This may ensure that the calibration accuracy, e.g., in the situation where sensor(s) drift or otherwise suddenly become out of tolerance, of the vehicle sensor system remains within the acceptable tolerance range, which may mitigate or avoid a dangerous situation for the vehicle, other vehicles, pedestrians, infrastructure, etc.

SUMMARY

The described techniques relate to improved methods, systems, devices, and apparatuses that support vehicle-to-everything (V2X) assisted dynamic calibration of automotive sensors. There may be various technologies that can enable or otherwise support V2X capabilities, e.g., Institute of Electrical and Electronics Engineers (IEEE) 802.11p based dedicated short range communications (DSRC), fifth generation (5G) cellular technology, and other defined CV2X technology. The described techniques provide various mechanisms by which one or more of the sensors installed in a vehicle can be calibrated, as well as cross-calibration of the automotive sensor system as a whole, using a roadside unit and one or more associated calibration objects. This may ensure that the advanced driver assistance system (ADAS) remains operational. The vehicle, roadside unit, and calibration object, may use any of the V2X based networks (such as an 802.11p based DSRC network, or a third generation partnership project (3GPP) defined CV2X network, and/or long term evolution/fifth generation (LTE/5G) network) to exchange one or more messages for calibrating sensor(s) on the vehicle. For example, roadside units may generally be associated with one or more calibration objects. A calibration object may be any object with defined or known properties that can serve as a baseline or reference point for sensor calibration. These defined or known properties may include, for example, shape, size, location, color, optical or electromagnetic properties, etc. In some examples, the calibration object may be a passive object and/or may be an active object capable of transmitting signals. The roadside unit may transmit calibration availability messages as needed and/or according to a periodic schedule that identifies calibration characteristic(s) of associated roadside object(s).

Aspects of the described techniques may be implemented by a vehicle-based wireless device. The vehicle itself may have one or more sensors installed, but each sensor may not be configured with cellular capabilities. However, the vehicle may be equipped with CV2X/5G capabilities, which can be leveraged to enable ADAS to engage in the exchange of information with other cellular-based vehicles, e.g., a cellular vehicle-to-*, where * may refer to pedestrians, infrastructure, other vehicles, etc. The vehicle may include an on-board unit (OBU), controller, processor, etc., in hardware and/or software, that manages aspects of the vehicle sensors, cellular connectivity, and the like, for the vehicle. Accordingly, references herein to a vehicle-based wireless device may generally refer to the vehicle, the sensor(s) installed in the vehicle, the OBU (e.g., controller or processor, etc.), the components that support vehicle based cellular connectivity, hardware, software, and the like, alone or in any combination, that implement aspects of the described techniques. In some aspects, references to communications being performed by the vehicle-based wireless device may be managed by the OBU, e.g., communications between vehicle-based wireless devices may refer to, or include, communications between OBUs of the respective vehicles. In some examples, the vehicle based wireless device may be referred to as the vehicle, device, system, apparatus, and the like.

The vehicle-based wireless device approaching a roadside unit may receive the calibration availability message from the roadside unit (e.g., the roadside unit may use a traveler information message (TIM) or road side message (RSM)) and determine the sensor characteristics of the sensor(s) installed on the vehicle and/or for the vehicle itself. The vehicle-based wireless device may measure the calibration characteristics of the calibration object using the sensor while the vehicle is within a defined range of the calibration object, e.g., while the vehicle passes by the calibration object. The vehicle may calibrate the sensor used to measure the calibration characteristics of the calibration object in a calibration procedure based, at least in some aspects, on the calibration characteristics of the calibration object, the measured calibration characteristics, and/or the sensor characteristics for the sensor. Accordingly, the vehicle-based wireless device may utilize V2X-based communications to communicate with a roadside unit/calibration object to dynamically calibrate one or more sensors as the vehicle passes by such calibration objects.

A method of image processing at a vehicle-based wireless device is described. The method may include receiving a calibration availability message from a roadside unit identifying one or more calibration characteristics of a calibration object associated with the roadside unit, determining one or more sensor characteristics for a sensor of a vehicle and the vehicle, measuring the one or more calibration characteristics of the calibration object using the sensor while the vehicle is within a defined range of the calibration object, and performing a calibration procedure to calibrate the sensor based on the identified one or more calibration characteristics, the measured one or more calibration characteristics, and the one or more sensor characteristics.

An apparatus for image processing at a vehicle-based wireless device is described. The apparatus may include a processor, memory coupled with the processor, and instructions stored in the memory. The instructions may be executable by the processor to cause the apparatus to receive a calibration availability message from a roadside unit identifying one or more calibration characteristics of a calibration object associated with the roadside unit, determine one or more sensor characteristics for a sensor of a vehicle and the vehicle, measure the one or more calibration characteristics of the calibration object using the sensor while the vehicle is within a defined range of the calibration object, and perform a calibration procedure to calibrate the sensor based on the identified one or more calibration characteristics, the measured one or more calibration characteristics, and the one or more sensor characteristics.

Another apparatus for image processing at a vehicle-based wireless device is described. The apparatus may include means for receiving a calibration availability message from a roadside unit identifying one or more calibration characteristics of a calibration object associated with the roadside unit, determining one or more sensor characteristics for a sensor of a vehicle and the vehicle, measuring the one or more calibration characteristics of the calibration object using the sensor while the vehicle is within a defined range of the calibration object, and performing a calibration procedure to calibrate the sensor based on the identified one or more calibration characteristics, the measured one or more calibration characteristics, and the one or more sensor characteristics.

A non-transitory computer-readable medium storing code for image processing at a vehicle-based wireless device is described. The code may include instructions executable by a processor to receive a calibration availability message from a roadside unit identifying one or more calibration characteristics of a calibration object associated with the roadside unit, determine one or more sensor characteristics for a sensor of a vehicle and the vehicle, measure the one or more calibration characteristics of the calibration object using the sensor while the vehicle is within a defined range of the calibration object, and perform a calibration procedure to calibrate the sensor based on the identified one or more calibration characteristics, the measured one or more calibration characteristics, and the one or more sensor characteristics.

Some examples of the method, apparatuses, and non-transitory computer-readable medium described herein may further include operations, features, means, or instructions for transmitting a calibration request message to the roadside unit identifying a type of calibration procedure to be performed.

In some examples of the method, apparatuses, and non-transitory computer-readable medium described herein, the calibration request message includes a basic safety message (BSM).

In some examples of the method, apparatuses, and non-transitory computer-readable medium described herein, performing the calibration procedure may include operations, features, means, or instructions for reading a visual display on the calibration object using the sensor, where the sensor includes an image sensor, comparing the visual display to the one or more sensor characteristics for the sensor, and calibrating the sensor based on the comparing.

In some examples of the method, apparatuses, and non-transitory computer-readable medium described herein, the visual display includes at least one of an active visual display, a static visual display, or a combination thereof.

In some examples of the method, apparatuses, and non-transitory computer-readable medium described herein, performing the calibration procedure may include operations, features, means, or instructions for transmitting a radio detection and ranging (RADAR) signal to the calibration object, where the sensor includes a radio frequency (RF)-based proximity and ranging sensor, receiving, using the sensor, a response RADAR signal from the calibration object based on the RADAR signal, and calibrating the sensor based on the response RADAR signal.

In some examples of the method, apparatuses, and non-transitory computer-readable medium described herein, performing the calibration procedure may include operations, features, means, or instructions for transmitting a light detection and ranging (LIDAR) signal to the calibration object, where the sensor includes a light-based proximity and ranging sensor, identifying, using the sensor, a three-dimensional (3D) profile of the calibration object based on a LIDAR signal reflected from the calibration object, and calibrating the sensor based on the 3D profile.

Some examples of the method, apparatuses, and non-transitory computer-readable medium described herein may further include operations, features, means, or instructions for determining, based on a location of the vehicle, that the vehicle may be within the defined range of the calibration object.

Some examples of the method, apparatuses, and non-transitory computer-readable medium described herein may further include operations, features, means, or instructions for performing an authentication procedure with the roadside unit based on the calibration availability message and prior to performing the calibration procedure, and verifying, based on the authentication procedure, that the vehicle may be permitted to perform the calibration procedure.

In some examples of the method, apparatuses, and non-transitory computer-readable medium described herein, the roadside unit includes at least one of a multi-purpose traffic light, or a traffic safety node, or a roadside communications node, or a base station, or a different vehicle, or a combination thereof.

In some examples of the method, apparatuses, and non-transitory computer-readable medium described herein, the calibration object includes at least one of a location marker, or an object having a defined shape, size, color, location, orientation, or movement profile, or an object displaying a defined image, or an object configured to transmit a responsive RADAR signal, or a combination thereof.

In some examples of the method, apparatuses, and non-transitory computer-readable medium described herein, the one or more calibration characteristics include at least one of a location, or a size, or a shape, or a visual image, or a 3D profile, or a combination thereof.

In some examples of the method, apparatuses, and non-transitory computer-readable medium described herein, the calibration availability message includes at least one of a TIM, or a roadside message, or a combination thereof.

Some examples of the method, apparatuses, and non-transitory computer-readable medium described herein may further include operations, features, means, or instructions for performing the calibration procedure using the calibration object includes a subscription-based service.

DETAILED DESCRIPTION

Figure 1:
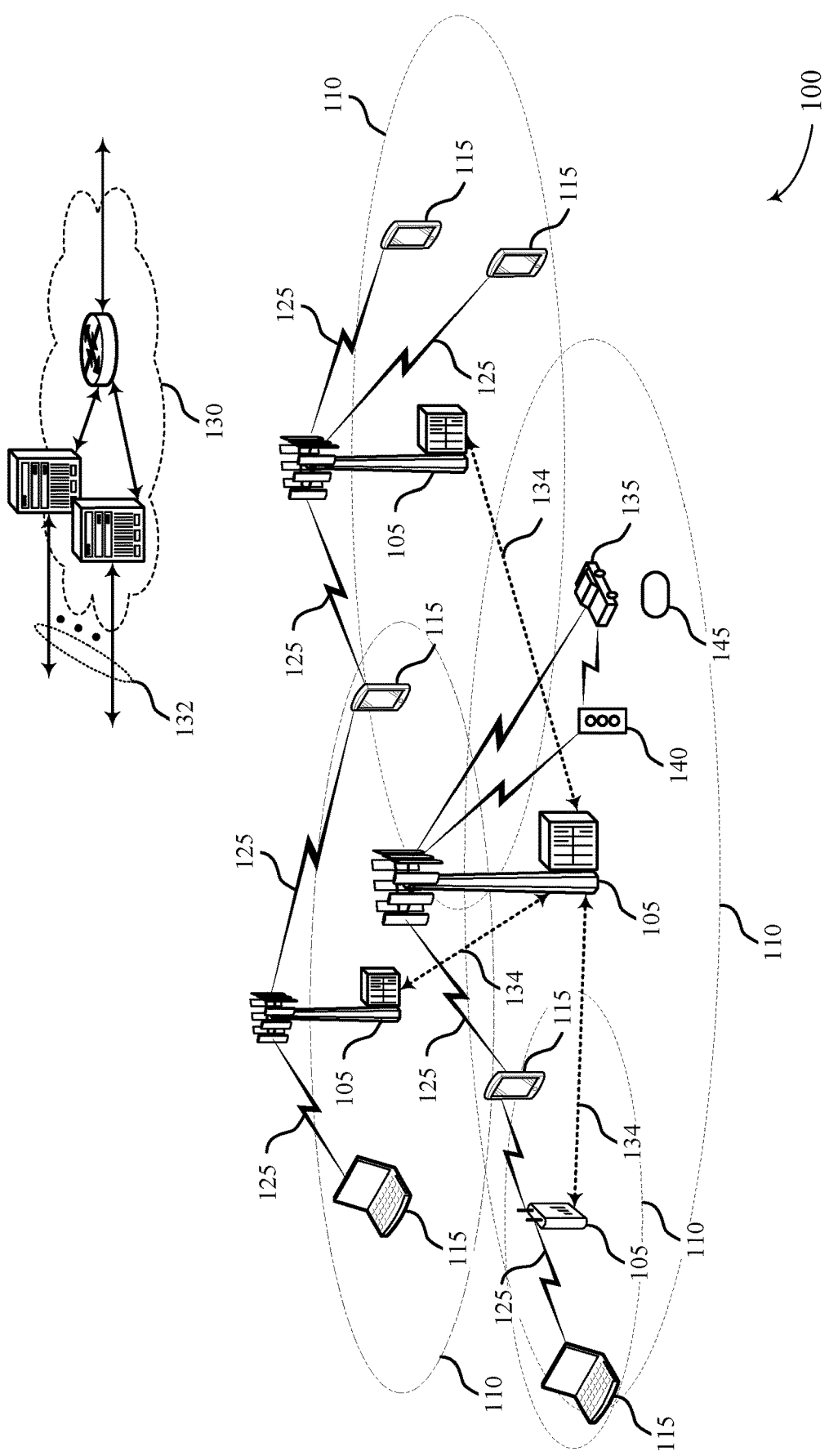
FIG. 1 illustrates an example of a system for wireless communications that supports vehicle-to-everything (V2X) assisted dynamic calibration of automotive sensors in accordance with aspects of the present disclosure.

Wireless networks may be configured to support vehicle-based communications. For example, the vehicle-based wireless device, which may also be referred to as a user equipment (UE), an on board unit (OBU), etc., (as discussed above) may be configured or otherwise support wireless communications with other vehicles (e.g. vehicle-to-vehicle (V2V), road side nit (e.g., vehicle-to-infrastructure (V2I), pedestrian (e.g., vehicle-to-pedestrian (V2P) within the range of vehicle-to-everything (V2X) technology. Such communications may include exchanging various safety, traffic management, etc., information over the wireless network, e.g., basic safety message (BSM), traveler information message (TIM), etc. Vehicles equipped with such a vehicle based wireless device may also have various sensors installed. The sensors (e.g., image sensors, location sensors, position and ranging sensors, etc.) provide input to an OBU of the vehicle that is used to determine the location of the vehicle, the orientation of the vehicle, the environment surrounding the vehicle, etc., for safety and traffic operation functions. Initially, the sensors are installed and calibrated by the vehicle manufacture and/or an aftermarket provider using complicated and expensive equipment in a labor-intensive and lengthy (e.g., takes a considerable amount of time) process. This may ensure that the calibration accuracy, e.g., in the situation where sensor(s) drift or otherwise suddenly become out of tolerance, of the vehicle sensor system is within the acceptable tolerance range. However, the vehicle sensor(s) (and/or sensor system) may suddenly and/or slowly become out of calibration due to shock, for example, which results in the previous calibration becoming unusable.

Aspects of the disclosure are initially described in the context of a wireless communications system, such as a V2X network. Aspects of the described techniques may include a vehicle-based wireless device, a roadside unit, and a calibration object associated with the roadside unit, leveraging the V2X network to support the dynamic calibration of sensor(s) installed on the vehicle. Broadly, this may include the vehicle-based wireless device exchanging messages with a roadside unit as the vehicle approaches the roadside unit, and then calibrating the sensor as the vehicle passes the calibration object. For example, the roadside unit may transmit or otherwise provide a calibration availability message (e.g., BSM) that carries or conveys information identifying calibration characteristics of the calibration object associated with a roadside unit. The calibration object may be a known or existing object (e.g., building, a statute, sign, etc.) or may be a special purpose object (e.g., an active and/or passive object installed for calibration purposes). The vehicle-based wireless device may determine the sensor characteristics for the sensor(s) installed on the vehicle and/or characteristics of the vehicle itself (e.g., location, speed, direction, orientation, etc.). Once the vehicle approaches the calibration object (e.g., is within the defined range), the vehicle-based wireless device may measure calibration characteristics of the calibration object using the sensor(s) of the vehicle. The vehicle-based wireless device may then perform the calibration procedure to calibrate the sensor using, for example, the calibration characteristics of the calibration object identified in the calibration availability message, the sensor characteristics of the sensor, the measured calibration characteristics, and/or the characteristics of the vehicle.

This may permit the vehicle-based wireless device to dynamically calibrate/cross-calibrate vehicle sensors using the V2X network. This may greatly reduce the complexity and/or costs associated with calibrating vehicle sensors. This may also increase the frequency in which vehicle sensors are calibrated, resulting in improved sensor functionality/accuracy. Moreover, the described dynamic sensor calibration techniques may enable additional sensors/sensor types to be installed on the vehicles without significant cost increases, further improving vehicle and driver safety. Moreover, the signaling techniques supporting dynamic sensor calibration may use minimal over-the-air resources, thus improving spectral efficiency.

Aspects of the disclosure are further illustrated by and described with reference to apparatus diagrams, system diagrams, and flowcharts that relate to V2X assisted dynamic calibration of automotive sensors.

FIG. 1 illustrates an example of a wireless communications system 100 that supports V2X assisted dynamic calibration of automotive sensors in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support vehicle-based wireless communications, e.g., CV2X, V2X, V2V, etc. In some aspects, a V2X network may define two transmission modes that, together, enable a broad range of use cases. Direct V2X, which includes V2V and V2I, and V2P, which provides enhanced communication range and reliability in dedicated ITS 5.9 GHz spectrum that's independent of a cellular network, as well as network communications (V2N) in traditional mobile broadband licensed spectrum. Wireless communications system 100 may support a V2X network, e.g., an 802.11p based V2X (where 802.11p is used for direct communication such as V2V, V2P, V2I), a CV2X network (where a 3GPP defined LTE direct communication is used).

For example, wireless communications system 100 may be configured for wireless communication supporting vehicle safety and traffic management functions. Devices performing such wireless communications may include one or more vehicle based wireless devices 135 and one or more roadside units 140, which each roadside unit 140 associated with one or more calibration objects 145. In some aspects, the vehicle based wireless devices 135 and/or roadside units 140 may be examples of a UE 115, which may also be referred to as v-UEs. That is, the vehicle based wireless device 135 may be a vehicle configured with one or more components, devices, functions, etc., that support performing wireless communications within wireless communications system 100. In some aspects, one or more of the calibration objects 145 may also be configured to support wireless communications, within wireless communications system 100 and/or wireless communications using different radio access technologies.

In some aspects, vehicle based wireless communications may be performed via a base station 105. In some aspects, vehicle based wireless communications may be performed directly between vehicle based wireless devices 135, between vehicle based wireless device 135 and roadside units 140, between roadside units 140, and the like. In some aspects, such vehicle-based communications may be performed using one or more sidelink channels, e.g., a physical sidelink control channel (PSCCH), a physical sidelink shared channel (PSSCH), and the like.

In some aspects, a vehicle based wireless device 135 may receive a calibration availability message from a roadside unit 140 identifying one or more calibration characteristics of a calibration object 145 associated with the roadside unit 140. The vehicle based wireless device 135 may determine one or more sensor characteristics for a sensor of the vehicle and the vehicle. The vehicle based wireless device 135 may measure the one or more calibration characteristics of the calibration object 145 using the sensor while the vehicle is within a defined range of the calibration object 145. The vehicle based wireless device 135 may perform a calibration procedure to calibrate the sensor based at least in part on the identified one or more calibration characteristics, the measured one or more calibration characteristics, and the one or more sensor characteristics.

Figure 2:
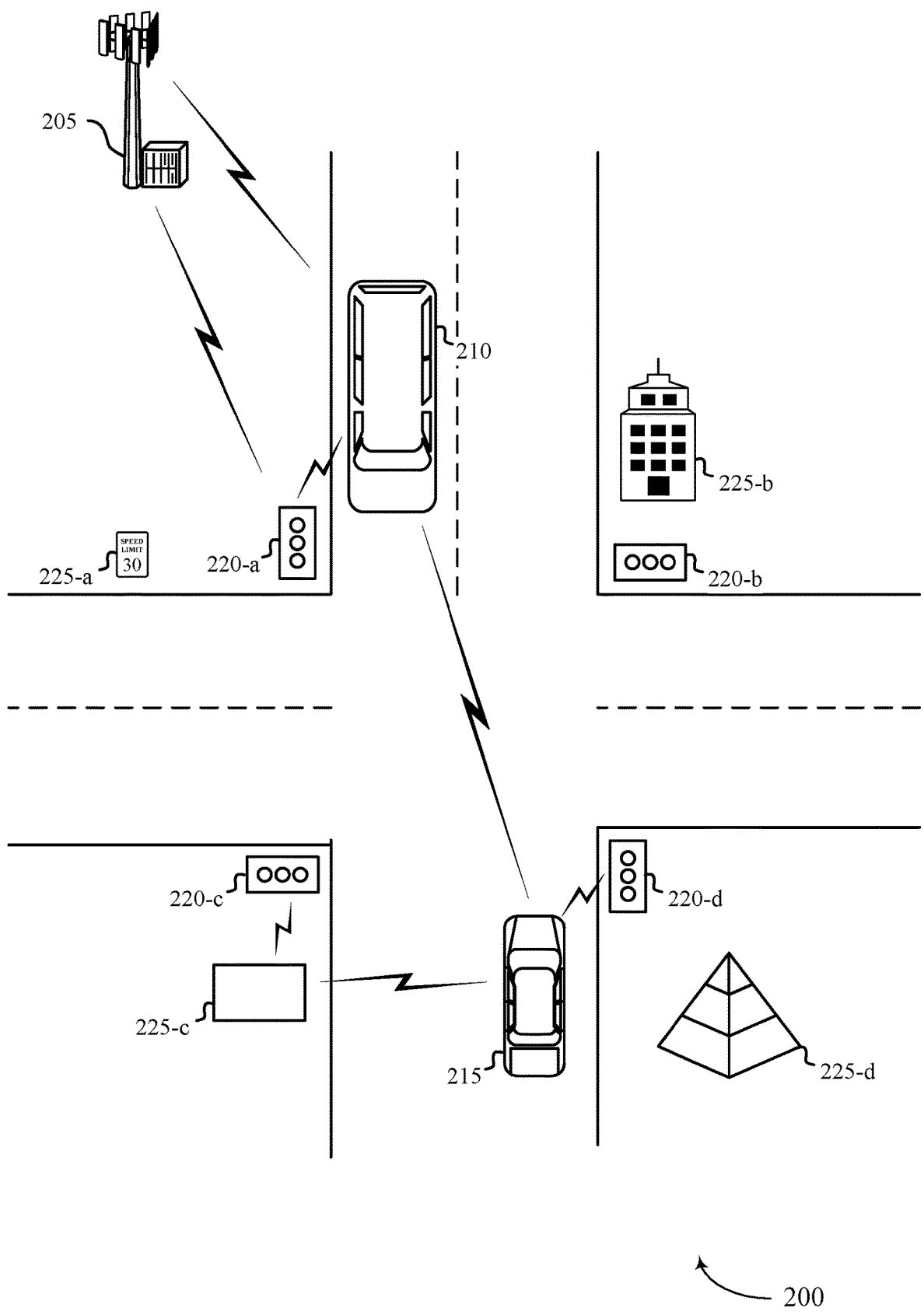
FIG. 2 illustrates an example of a wireless communication system that supports V2X assisted dynamic calibration of automotive sensors in accordance with aspects of the present disclosure.

FIG. 2 illustrates an example of a wireless communications system 200 that supports V2X assisted dynamic calibration of automotive sensors in accordance with aspects of the present disclosure. In some examples, wireless communications system 200 may implement aspects of wireless communications system 100. Wireless communications system 200 may include base station 205, vehicle based wireless devices 210 and 215, roadside units 220 and associated calibration objects 225, which may be examples of corresponding devices described herein.

Vehicle-based wireless devices 210 and 215 generally may be examples of a UE as described herein. That is, vehicle-based wireless devices 210 and 215 may generally include any sort of vehicle (e.g., automobile, bus, truck, train, etc.) that is equipped to perform wireless communications within a V2X network. For example, the vehicle may include an onboard unit (OBU) that manages one or more operational aspects of the vehicle. For example, the OBU may have integrated and/or separate components coupled to the OBU that support or are otherwise configured to perform the wireless communications within the V2X network. In some aspects, the wireless communications may be performed between vehicle-based wireless devices 210 or 215 and base station 205 and/or may be performed between vehicle-based wireless devices 210 and 215.

Vehicle-based wireless devices 210 and 215 may also include a variety of sensors that collect and provide data to the OBU. Broadly, there may be any number and/or type of sensors configured in vehicle-based wireless devices 210 and 215. Examples of the sensors include, but are not limited to, visual or image sensors (e.g., a camera), proximity and ranging sensors (e.g., radio detection and arranging (RADAR), light detection and ranging (LIDAR), audio sensors (e.g., microphones), position based sensors (e.g., GPS), orientation based sensors (e.g., to determine the physical orientation of the vehicles), speed based sensors, and the like. Vehicle-based wireless devices 210 and 215 may also include a location or position function that is in addition to or in lieu of a GPS sensor. Such sensors may generally be installed in different locations of the vehicles, e.g., in an overlapping or non-overlapping field of view/coverage manner. The sensors may generally collect data for the area surrounding the vehicles in order to support vehicle safety and operational functions. For example, the OBU (e.g., vehicle-based wireless devices 210 and/or 215) may collect the sensor data and use this information in support of advanced driver assistant systems (ADAS) or other similar functions. For example, the OBU may utilize such sensor inputs to support reversing assistance, adaptive cruise control, traffic sign recognition, blind spot detection, blind spot assistance, lane departure or warning, a 360° all around view, and the like.

Roadside units 220 may generally refer to any device that is positioned, at least to some degree, along the side of the road that vehicle-based wireless devices 210 and 215 travel. Although only four roadside units 220 are shown (e.g., roadside units 220-a, 220-b, 220-c, and 220-d), it is to be understood that more or less roadside units 220 may be implemented in wireless communications system 200. As can be appreciated, current road/infrastructure generally includes a large number of objects with well-defined coordinates, shape, etc. (e.g., calibration characteristics), such as bridges, road signs, stoplights, etc. More and more of these objects may be equipped with, or otherwise configured as, roadside units 220 that are capable of broadcasting specific information pertaining to the road conditions, traffic hazards, etc. Aspects of the described techniques may include establishing/installing sensor-specific targets (e.g., calibration objects 225) at various places along the road. The roadside units 220 may provide information about the calibration object 225 using the V2X infrastructure, e.g., information about their location, such as latitude, longitude, altitude (LLA), or any other reference coordinates.

Each roadside unit 220 may be configured to support wireless communications within a V2X network. For example, roadside units 220 may communicate with vehicle-based wireless devices 210 and 215 directly (e.g., via a sidelink channel) and/or indirectly via base station 205. Although the image illustrated in FIG. 2 shows the roadside units 220 as being traffic lights, it is to be understood that any device configured as described herein may serve, act, or otherwise be considered a roadside unit 220 within the context of the described techniques. For example, roadside units 220 may be implemented in existing devices (e.g. such as traffic lights, signs, etc.) and/or may be implemented in a stand-alone device (e.g., a device, component, function, etc., position within a defined range of a road configured as described herein).

In order to support various ADAS features, for example, the vehicles may be equipped with various sensors, including cameras, RADAR, LIDAR, and the like. To make sense of the data generated by such sensors, data obtained from one sensor may be related to data obtained from a different sensor. As one example, a vehicle equipped with two cameras, and each camera having at least partially different field of view, may see different objects. Some of the objects may be visible from both cameras, and some objects may only be visible to one of the cameras. In order to use the two cameras, the pose of each camera in regards to the other cameras in the vehicle must be understood in order to interpret the images collected from both cameras. This may be extended such that the pose of each sensor on the vehicle must be known with reference to some other reference frame (and, consequently, to each of the other sensors).

During the course of normal vehicle operations, it may be important maintain a confidence level that the sensors remain calibrated and/or cross-calibrated (e.g., to within a degree of acceptable tolerances). If the sensors come out of alignment, there may also need to generate a new calibration tree to calibrate the sensors. The sensors are initially calibrated by the manufacture, and may be recalibrated during the replacement/repair by an authorized service provider (e.g., using a calibration tree, such as a calibration tree with closed paths for accuracy estimation). The initial calibration process is a labor-intensive, time-consuming process requiring specialized equipment and intensive post processing. It may be impractical to expect that the methods/equipment used during the initial factory calibration can be easily implemented during routine vehicle operation.

In some approaches, the vehicle-based wireless devices 210 and 215 may determine sensor characteristics for each of the sensors installed on the vehicle. Additionally, the vehicle-based wireless devices 210 and 215 may also identify or otherwise determine vehicle characteristics of the vehicle. For example, vehicle-based wireless devices 210 and 215 may extract or otherwise determine information on self-motion (e.g., the motion of the vehicle provided through a global navigation satellite system (GNSS), inertial measurement unit (IMU) system, and the like). Additionally, vehicle-based wireless devices 210 and 215 may extract or otherwise determine information from the sensors (e.g., the sensor characteristics). In the example where the sensor is a camera, this may include gathering information about stationary objects (e.g., calibration objects 225) using computer vision (CV) algorithms. The vehicle-based wireless devices 210 and 215 may use this information to enhance the accuracy of the positioning sub-system on the sensor suite, perform online calibration of the sensors, and the like.

This approach may establish accurate self-motion trajectory of the vehicle, and movement of the stationary objects through the sensor field of view. The collected information supports calculating the 6° of freedom pose of the sensor in the vehicle reference frame, and compares these values with the original calibration tree. This may support a determination about the current status of the calibration of the sensors and updating the calibration tree when necessary. For other sensor types (e.g., RADAR, LIDAR, etc.), there may also be methods available to perform dynamic calibration leveraging information available from a positioning sensor suite and other sensors. However, the results of such approaches are generally not ideal. For example, due to the circular dependency (e.g., camera>GNSS/IMU/Positioning>Camera), the accuracy of such dynamic calibration techniques is relatively low, and may not be suitable when stricter tolerances are desired.

Accordingly, aspects of the described techniques enhance the accuracy of the online calibration process by breaking the need to employ the circular pattern to feed camera data into the positioning engine to gain information about self-motion of the vehicle in order to calibrate the camera sensor. That is, instead of using the sensor to find a stationary object within a field of view and trying to establish the vehicle's position by leveraging the information of the self-motion and observed motion of the object in the sensor's field of view, the described techniques may provide a system with a set of calibration objects 225 that have a location (e.g., in a global reference frame) and/or other characteristic that is known to the vehicle-based wireless devices 210 and 215 at the time of measurements. The information collected/measured will allow to greatly enhance the accuracy of the dynamic calibration process as the self-motion of the vehicle and the coordinates (or other characteristics) of the calibration objects 225 can be extracted from highly accurate independent sources, thus allowing significant improvement of the accuracy of the sensor calibration process.

Accordingly, one or more of the roadside units 220 may be associated with one or more calibration objects 225, with calibration objects 225-*a*, 225-*b*, 225-*c*, and 225-d being shown by way of example only. Calibration objects 225 may generally include any object that can serve or is otherwise configured to support a calibration procedure as described herein. The calibration objects 225 may be active and/or passive. Each calibration object 225 may have an associated set of calibration characteristics. The calibration characteristics may include any known feature of the corresponding calibration object 225. For example, the calibration characteristics may include a location, size, shape, color, a particular visual image, a three-dimensional (3D) profile, and the like. Examples of the calibration objects 225 may include but are not limited to, a location marker, any object having a defined shape, size, color, location, orientation, movement profile, and the like. A calibration object 225 may include an object displaying a defined image (e.g., text, picture, pattern, barcode, etc.). A calibration object 225 may include passive object (e.g., static or otherwise fixed) and/or an active object. An active calibration object 225 may include an object with a changing shape, displayed image, size, etc. One example of an active calibration object 225 may include an object that is configured or otherwise supports transmitting a responsive signal, e.g., a responsive RADAR signal. That is, when the described techniques are used for calibrating a RADAR sensor, the RADAR sensor may be calibrated passively (e.g., transmitting a RADAR signal towards the calibration object 225 and measuring the reflected RADAR signal to calibrate the sensor) and/or actively (e.g., where the calibration object 225 processes the transmitted radar signal and transmits a responsive RADAR signal that is based on the RADAR signal received by the calibration object 225).

As discussed, each roadside unit 220 may be associated with one or more of the calibration objects 225. This may include the roadside unit 220 being aware or otherwise determining the calibration characteristics of the associated calibration objects 225. For example, the calibration characteristics of each associated calibration object 225 may be programmed into, or otherwise determined by, each roadside unit 220.

In some aspects, each roadside unit 220 may transmit (in a unicast, multicast, and/or broadcast transmission) calibration availability messages that carry or convey information identifying the calibration characteristics for each calibration object 225 associated with the roadside unit 220. A calibration availability message may be transmitted according to a defined schedule and/or as needed. For example, the calibration availability message may be transmitted periodically by each roadside unit 220 (e.g., in a network initiated calibration procedure) and/or in response to a calibration request message (e.g., a TIM, RSM, and the like) received from one or more of the vehicle-based wireless devices 210 and 215 (e.g., in a vehicle-based wireless device initiated calibration procedure). Examples of the calibration availability messages may include, but are not limited to, a BSM or some other message configured to identify the calibration characteristics.

In some aspects, the calibration availability message may identify the calibration characteristics of each calibration object 225 associated with the roadside unit 220. In some aspects, the calibration availability message may identify the calibration characteristics explicitly using one or more bits, fields, etc. In other aspects, the calibration availability message may identify the calibration characteristics implicitly, e.g., by identifying the calibration object 225, by identifying an index number associated with the calibration object 225 and/or the corresponding calibration characteristics, and the like. In the implicit indication scenario, vehicle-based wireless devices 210 and 215 may receive the calibration availability message, determine the implicit indication provided in the calibration availability message, and access a look up table or some other similar feature to determine the calibration characteristics for the calibration object 225.

In some aspects, each vehicle-based wireless device 210 and 215 may receive the calibration availability message from a roadside unit 220 and determine the calibration characteristics of the calibration object 225 identified in the calibration availability message. Each vehicle-based wireless device 210 and 215 may also determine sensor characteristics for the sensor(s) of the vehicle and/or characteristics for the vehicle itself. Examples of the sensor characteristics include, but are not limited to, the type of sensor to be calibrated (e.g., a camera sensor, a RADAR sensor, etc.), the specifications for the sensor being calibrated (e.g., the operational parameters supported by the sensor), the location of the sensor on the vehicle (alone and/or in relation to other sensors on the vehicle), the field of view of the sensor, and the like. The characteristics of the vehicle may include, but are not limited to, the location of the vehicle, the orientation of the vehicle, the speed of the vehicle, the direction of travel of the vehicle, the nature/type/location of sensors on the vehicle, and the like. In some examples, the characteristics of the vehicle may include the current characteristics and/or projected characteristics. Projected characteristics may include, but are not limited to, and anticipated position of the vehicle (e.g., based on the road that the vehicles currently traveling on and/or based on previous trips that the vehicle has traveled), an anticipated speed of the vehicle (e.g., whether there are any stop signs, red lights, speed limit changes, etc., in the path of the vehicle), and the like.

For example, an OBU of the vehicle-based wireless device 210 and 215 may gather the sensor and/or vehicle characteristics in anticipation of performing a calibration procedure and/or may continuously monitor such information during normal vehicle operation, thus making this information available as needed. In one example, the OBU may collect such information in response to a trigger, e.g., based on a determination that the sensor has not been calibrated within a defined time frame, based on determining that the sensor has drifted or is otherwise out of calibration, and the like.

In some aspects, the OBU may collect such information in response to a determination that the vehicle is approaching a roadside unit 220 with an associated calibration object 225. For example, the OBU of vehicle-based wireless devices 210 and 215 may receive a calibration availability message from a roadside unit 220 identifying calibration characteristics of a calibration object 225. The OBU may determine that the calibration object 225 supports calibrating one or more of the sensors installed in the vehicle, and therefore determine or otherwise gather the sensor characteristics and/or vehicle characteristics.

Accordingly, the vehicle-based wireless devices 210 and 215 may measure the calibration characteristics of the calibration object 225 using the sensor while the vehicles within the defined range of the calibration object 225. The vehicle-based wireless devices 210 and 215 may perform a calibration procedure to calibrate the sensor using the measured calibration characteristics, the calibration characteristics identified in the calibration availability message, the sensor characteristics, the vehicle characteristics, and the like.

As can be appreciated, measuring the calibration characteristics of calibration object 225 and/or performing the calibration procedure to calibrate the sensor may be based, at least in some aspects, on the type of sensor and/or the type of calibration object 225.

In the situation where the sensor to be calibrated is an image sensor (e.g., camera), this may include using a two-dimensional barcode, text, image, pattern, etc., displayed on the calibration object 225. For example, the sensor may be used to read a visual display on the calibration object 225, with the vehicle-based wireless devices 210 and 215 comparing the visual display read from the calibration object 225 with the sensor characteristics for the sensor. That is, the calibration availability message may signal what is being displayed on the calibration object 225 (e.g., text, barcode, image, etc.). One or more of the image sensors on the vehicle may be used to read the visual display on the calibration object 225. Based on the sensor characteristics for the sensor, the visual display read from the calibration object 225, and/or the calibration characteristics of the calibration object 225, the vehicle-based wireless devices 210 and 215 may calibrate the sensor based on the comparison. As discussed, in some instances the calibration object 225 may be active and/or passive/static. In the situation where the calibration object 225 is active, an active visual display may be provided on the calibration object 225, with the characteristics of the active visual display being identified in the calibration availability message.

In the situation where the sensor to be calibrated is a radio frequency (RF)-based proximity and ranging sensor, this may include transmitting a RADAR signal to the calibration object 225. In the situation where the calibration object 225 is passive, the vehicle-based wireless devices 210 and 215 may calibrate the sensor based on the RADAR signal reflected from the calibration object 225. In the situation where the calibration object 225 is active, the vehicle-based wireless devices 210 and 215 may use the sensor to receive a response RADAR signal from the calibration object 225 based on the transmitted RADAR signal. The vehicle-based wireless devices 210 and 215 may calibrate the sensor based, at least in some aspects on the response RADAR signal. In another example, the calibration object 225 may simply transmit a response RADAR signal (e.g., independently from any RADAR signal received from a vehicle based wireless device 210 or 215), which may be detected by the sensor as the vehicle passes calibration object 225 and used to calibrate the sensor. In some aspects, when the calibration object 225 is a RADAR target, the calibration object 225 may be configured to use a time-gated active repeater that can simulate the vehicle moving in a specific speed. Again, the RF-based proximity ranging sensor may use information during a calibration procedure of the sensor.

In the situation where the sensor to be calibrated is a light detection and ranging (LIDAR) sensor, the calibration object 225 may have a 3D profile that can be used to calibrate the sensor. This may include the vehicle-based wireless devices 210 and 215 transmitting a LIDAR signal to the calibration object 225. The 3D profile of the calibration object 225 may be identified based, at least in some aspects, on the LIDAR signal reflected from the calibration object 225. That is, the calibration availability message may identify the 3D profile of the calibration object 225. The vehicle-based wireless devices 210 and 215 may use the calibration characteristics of the calibration object 225, the identified 3D profile of the calibration object 225 based on the LIDAR signal, the sensor characteristics, and/or the vehicle characteristics (e.g., location/orientation of the vehicle with respect to the calibration object 225) to calibrate the sensor of the vehicle. In some examples, the 3D profile of the calibration object 225 may include a 3D type of barcode target.

In some aspects, the described techniques for calibrating of sensor(s) of the vehicle-based wireless devices 210 and 215 may be authentication and/or subscription based. For example, each vehicle-based wireless device 210 and 215 may perform an authentication procedure with the roadside unit 220 before performing the calibration procedure. The vehicle-based wireless devices 210 and 215 may perform the authentication procedure based on the calibration availability message. The authentication procedure may ensure that the signals communicated between the roadside unit 220, calibration object 225, and/or the vehicle-based wireless devices 210 and 215 are secure or otherwise protected.

Additionally or alternatively, the described techniques for calibrating a sensor of the vehicle-based wireless devices 210 and 215 may be subscription based. That is, in some examples there may be a subscription service established with respect to the roadside units 220 and/or calibration object 225. In the situation where the calibration procedure is subscription based, each vehicle-based wireless device 210 and 215 may verify (e.g., based on the authentication procedure and/or separately from the authentication procedure) that the vehicle is permitted to perform the calibration procedure using the roadside unit 220 and/or calibration object 225.

Accordingly, aspects of the described techniques may include attaching each roadside unit 220 with and augmented reality (Aruco) labeled target (e.g., with a known LLA) to enable calibration of a camera sensor. Adjacent to each Aruco target, a LIDAR target may be placed. RADAR targets may also be installed at these locations (e.g., embedded into the poles), so that they can pick up signals (e.g., RADAR signals) from oncoming vehicles, and transmit return signals (e.g., response RADAR signals) with the configured profile.

As discussed, each vehicle-based wireless device 210 and 215 may be configured to perform wireless communications within a V2X network. V2X devices are configured to periodically transmit BSM, e.g., each vehicle may transmit a BSM at a rate of 10 Hertz, or some other periodicity. BSM generally includes the current position, speed, hitting, etc., along with other information. The BSM may be leveraged to include the state of the sensors the vehicle is equipped with. For example, the vehicle may advertise that is equipped with a camera that needs calibration. The roadside unit 220 may receive the BSM messages from vehicles coming within a defined range of the roadside unit 220 (e.g., typical V2X range may be around 1 km). This range advantage may allow the roadside unit 220 and the vehicle (e.g., the vehicle-based wireless devices 210 and 215) to communicate availability, capability, and other information necessary or otherwise needed for the calibration procedure. The vehicle will be able to start the calibration process before the calibration site (e.g., calibration object 225) is in the field of view of the sensor. This may ensure a smooth calibration process. The roadside unit 220 may communicate with the vehicle using a TIM, RSM, etc. Any of these messages may be used to communicate the information needed for calibration and/or a new message may be used.

Figure 3:
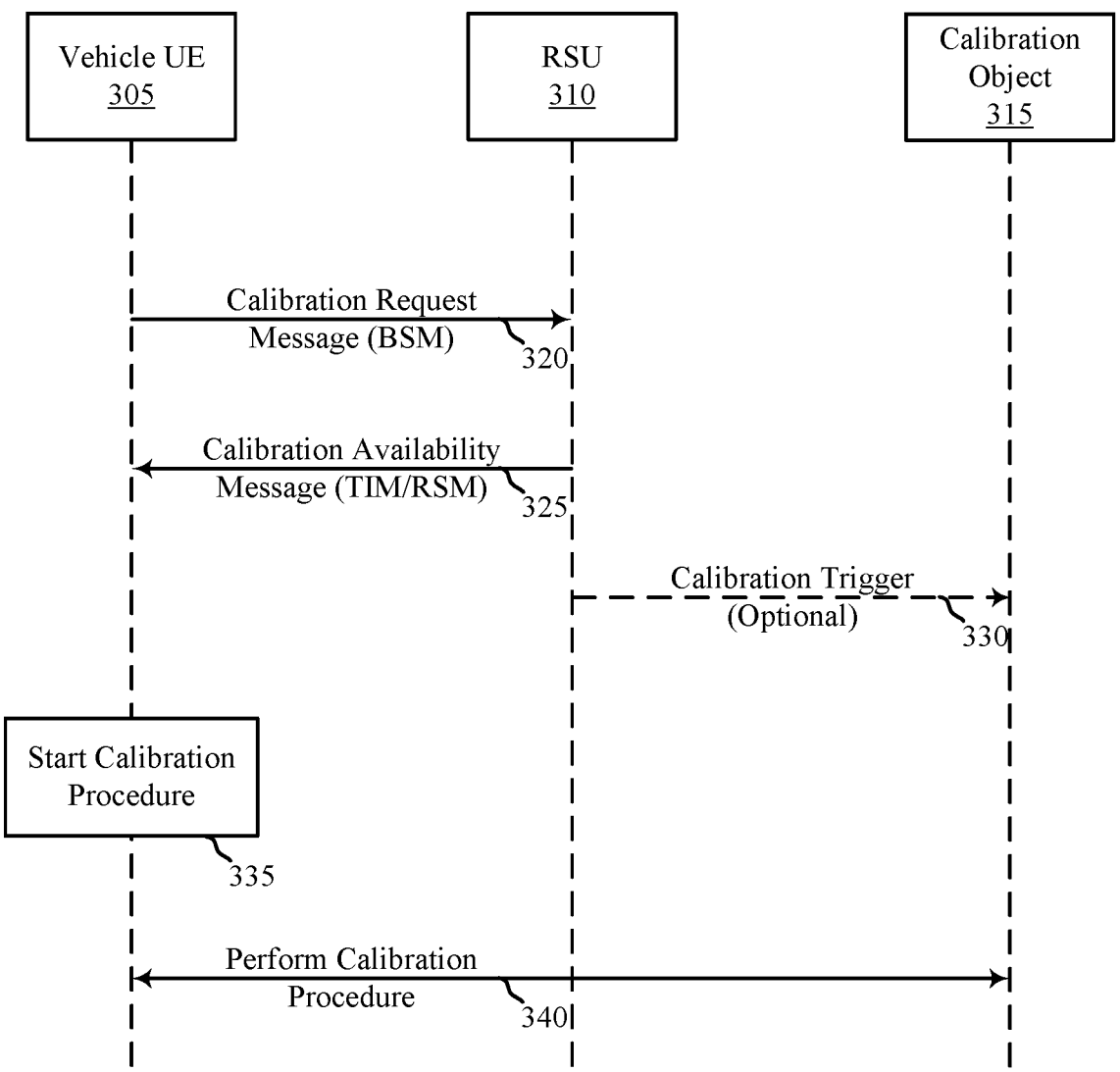
FIG. 3 illustrates an example of a process that supports V2X assisted dynamic calibration of automotive sensors in accordance with aspects of the present disclosure.

FIG. 3 illustrates an example of a process 300 that supports V2X assisted dynamic calibration of automotive sensors in accordance with aspects of the present disclosure. In some examples, process 300 may implement aspects of wireless communications systems 100 and/or 200. Aspects of process 300 may be implemented by vehicle UE 305, roadside unit 310, and/or calibration object 315, which may be examples of the corresponding devices described herein. In some aspects, vehicle UE 305 may be an example of a vehicle based wireless device and/or a UE, as is described herein. Process 300 illustrates an example of a vehicle initiated calibration process.

At 320, vehicle UE 305 may transmit (and roadside unit 310 may receive) a calibration request message (e.g., a BSM). Broadly, the calibration request message may carry or convey information identifying one or more sensors installed on vehicle UE 305 and/or identifying a type of calibration procedure to be performed. Vehicle UE 305 may transmit the calibration request message periodically and/or as needed. For example, vehicle UE 305 may transmit the calibration request message according to a periodic schedule. As another example, vehicle UE 305 may transmit the calibration request message based on the determination that the vehicle is within the defined range of roadside unit 310 and/or calibration object 315.

At 325, roadside unit 310 may transmit (and vehicle UE 305 may receive) a calibration availability message (e.g., a TIM, RSM, etc.). Broadly, the calibration availability message may carry or convey information identifying the calibration characteristics of calibration object 315 associated with roadside unit 310. For example, the calibration availability message may carry information indicating the availability of calibration object 315, the location of calibration object 315, etc., so the vehicle UE 305 can start the calibration process even before it can identify the calibration object 315.

At 330, roadside unit 310 may optionally transmit a calibration trigger to calibration object 315. For example, in the situation where calibration object 315 is an active calibration object, the trigger may serve to initiate the calibration procedure between the vehicle UE 305 and calibration object 315.

At 335, vehicle UE 305 may start the calibration procedure. This may include, vehicle UE 305 placing the sensor being calibrated into a calibration mode. In some examples, this may include vehicle UE 305 exchanging one or more messages with roadside unit 310 and/or calibration object 315, e.g., messages exchanging additional information used for/during the calibration procedure (e.g., various characteristics of calibration object 315 and/or the sensor being calibrated).

At 340, vehicle UE 305 may perform the calibration procedure using calibration object 315. For example, this may include vehicle UE 305 measuring the calibration characteristics of calibration object 315 using the sensor while the vehicle (e.g., the vehicle including vehicle UE 305) is within the defined range of calibration object 315. As discussed, the measured calibration characteristics may be based on the type of sensor being calibrated, the characteristics of the vehicle, the calibration characteristics measured from calibration object 315, and/or the calibration characteristics of calibration object 315 identified in the calibration availability message.

Figure 4:
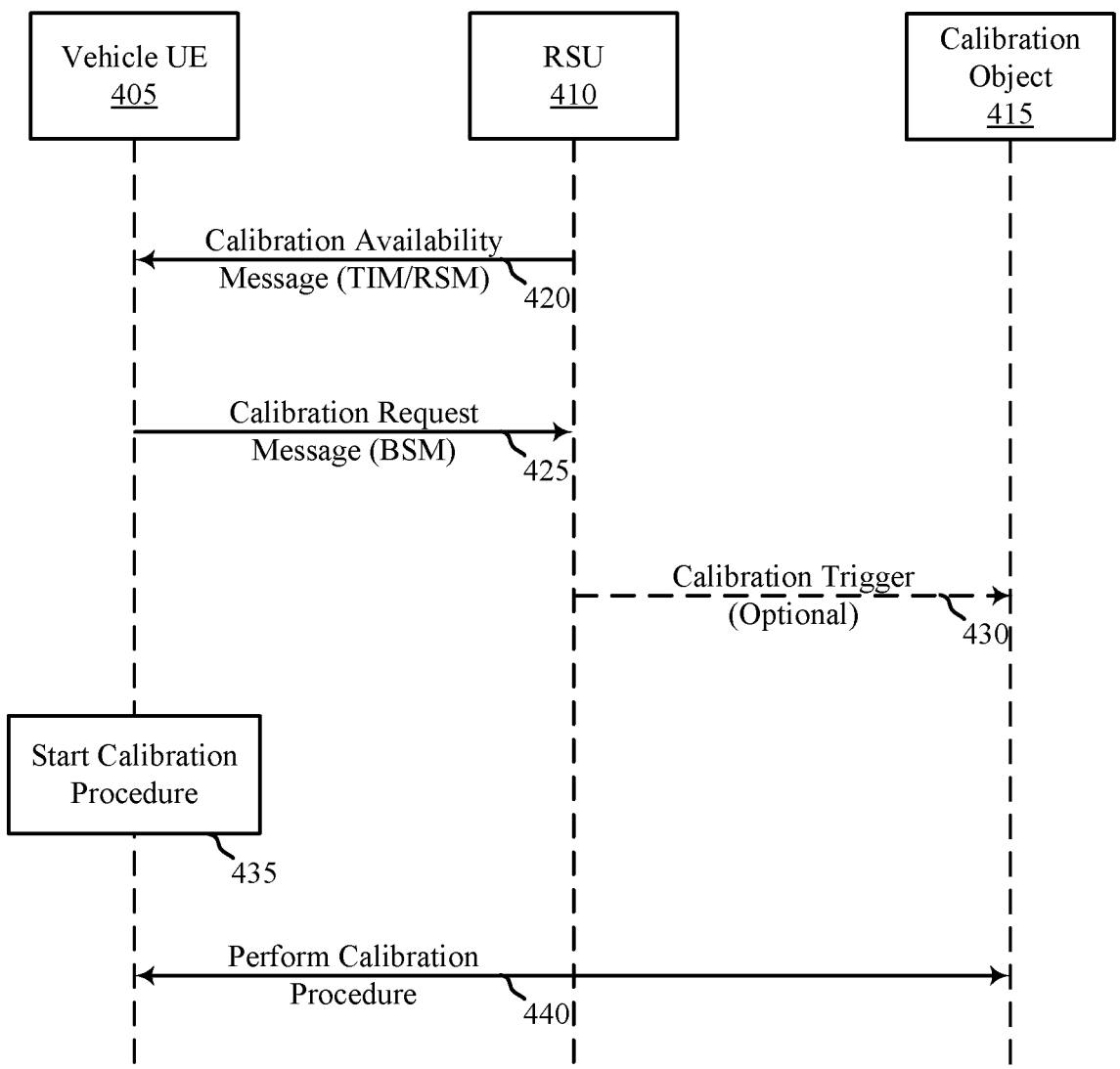
FIG. 4 illustrates an example of a process that supports V2X assisted dynamic calibration of automotive sensors in accordance with aspects of the present disclosure.

FIG. 4 illustrates an example of a process 400 that supports V2X assisted dynamic calibration of automotive sensors in accordance with aspects of the present disclosure. In some examples, process 400 may implement aspects of wireless communications systems 100 and/or 200 and/or process 300. Aspects of process 400 may be implemented by vehicle UE 405, roadside unit 410, and/or calibration object 415, which may be examples of the corresponding devices described herein. In some aspects, vehicle UE 405 may be an example of a vehicle based wireless device and/or UE, as is described herein. Process 400 illustrates an example of an infrastructure initiated calibration process.

At 420, roadside unit 410 may transmit (and vehicle UE 405 may receive) a calibration availability message (e.g., a TIM, RSM, etc.). Broadly, the calibration availability message may carry or convey information identifying the calibration characteristics of calibration object 415 associated with roadside unit 410. For example, the calibration availability message may carry information indicating the availability of calibration object 415, the location of calibration object 415, etc., so the vehicle UE 405 can start the calibration process even before it can identify the calibration object 415.

At 425, vehicle UE 405 may transmit (and roadside unit 410 may receive) a calibration request message (e.g., a BSM). Broadly, the calibration request message may carry or convey information identifying one or more sensors installed on vehicle UE 405 and/or identifying a type of calibration procedure to be performed. Vehicle UE 405 may transmit the calibration request message periodically and/or as needed. For example, vehicle UE 405 may transmit the calibration request message according to a periodic schedule. As another example, vehicle UE 405 may transmit the calibration request message based on determining that the vehicle is within the defined range of roadside unit 410 and/or calibration object 415.

At 430, roadside unit 410 may optionally transmit a calibration trigger to calibration object 415. For example, in the situation where calibration object 415 is an active calibration object, the trigger may serve to initiate the calibration procedure between the vehicle UE 405 and calibration object 415. In the situation where calibration object 415 is passive, the calibration trigger may not be necessary.

At 435, vehicle UE 405 may start the calibration procedure. This may include, vehicle UE 405 placing the sensor being calibrated into a calibration mode. In some examples, this may include vehicle UE 405 exchanging one or more messages with roadside unit 410 and/or calibration object 415, e.g., messages exchanging additional information used for the calibration procedure (e.g., various characteristics of calibration object 415 and/or the sensor being calibrated).

At 440, vehicle UE 405 may perform the calibration procedure using calibration object 415. For example, this may include vehicle UE 405 measuring calibration characteristics of calibration object 415 using the sensor while the vehicle (e.g., the vehicle including vehicle UE 405) is within a defined range of calibration object 415. As discussed, the measured calibration characteristics may be based on the type of sensor being calibrated, the characteristics of the vehicle, the calibration characteristics measured from calibration object 415, and/or the calibration characteristics of calibration object 415 identified in the calibration availability message.

Figure 5:
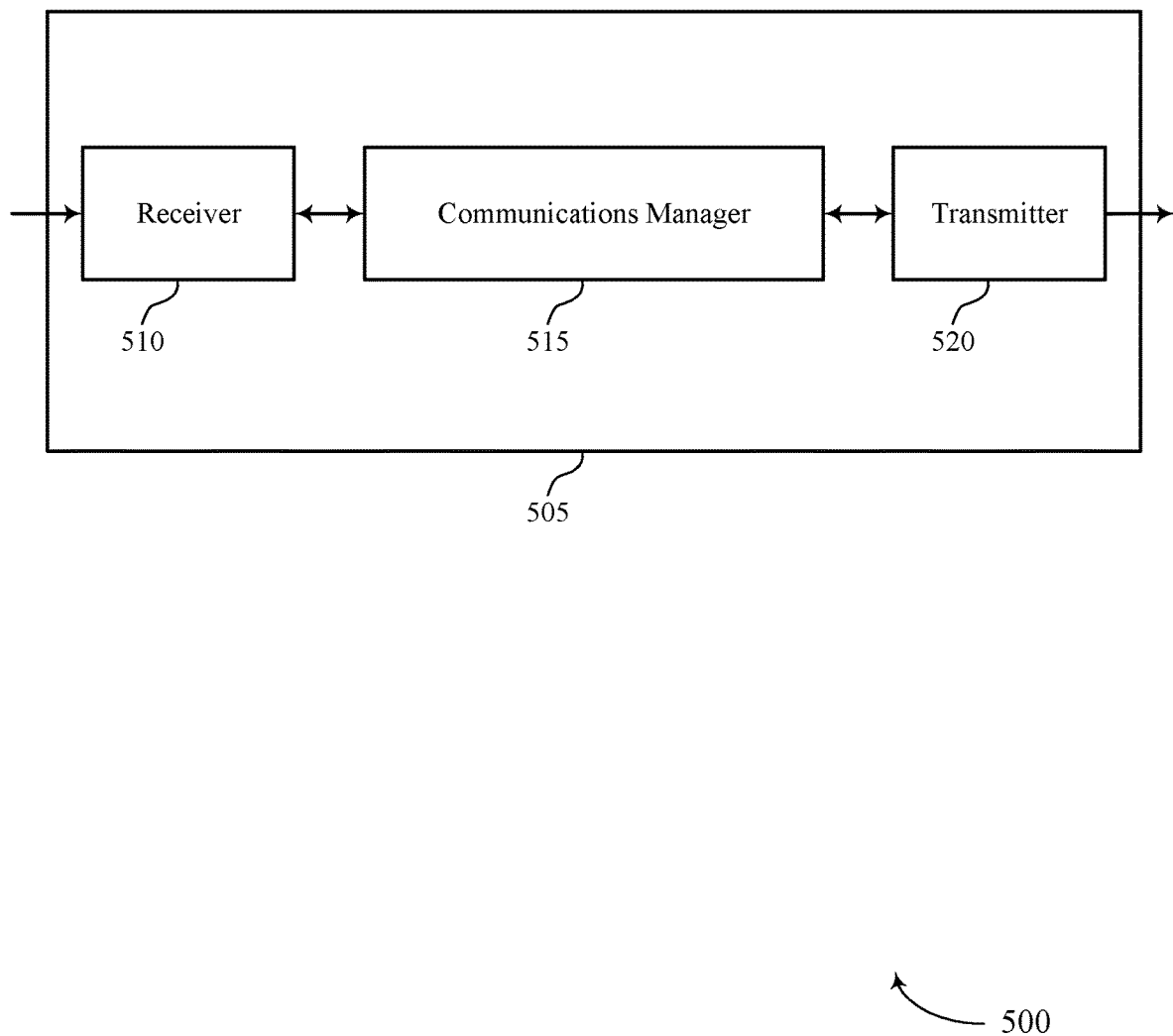
FIGS. 5 and 6 show block diagrams of devices that support V2X assisted dynamic calibration of automotive sensors in accordance with aspects of the present disclosure.

FIG. 5 shows a block diagram 500 of a device 505 that supports V2X assisted dynamic calibration of automotive sensors in accordance with aspects of the present disclosure. The device 505 may be an example of aspects of a vehicle-based wireless device and/or a UE, as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to V2X assisted dynamic calibration of automotive sensors, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a calibration availability message from a roadside unit identifying one or more calibration characteristics of a calibration object associated with the roadside unit, determine one or more sensor characteristics for a sensor of the vehicle and the vehicle, measure the one or more calibration characteristics of the calibration object using the sensor while the vehicle is within a defined range of the calibration object, and perform a calibration procedure to calibrate the sensor based on the identified one or more calibration characteristics, the measured one or more calibration characteristics, and the one or more sensor characteristics. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
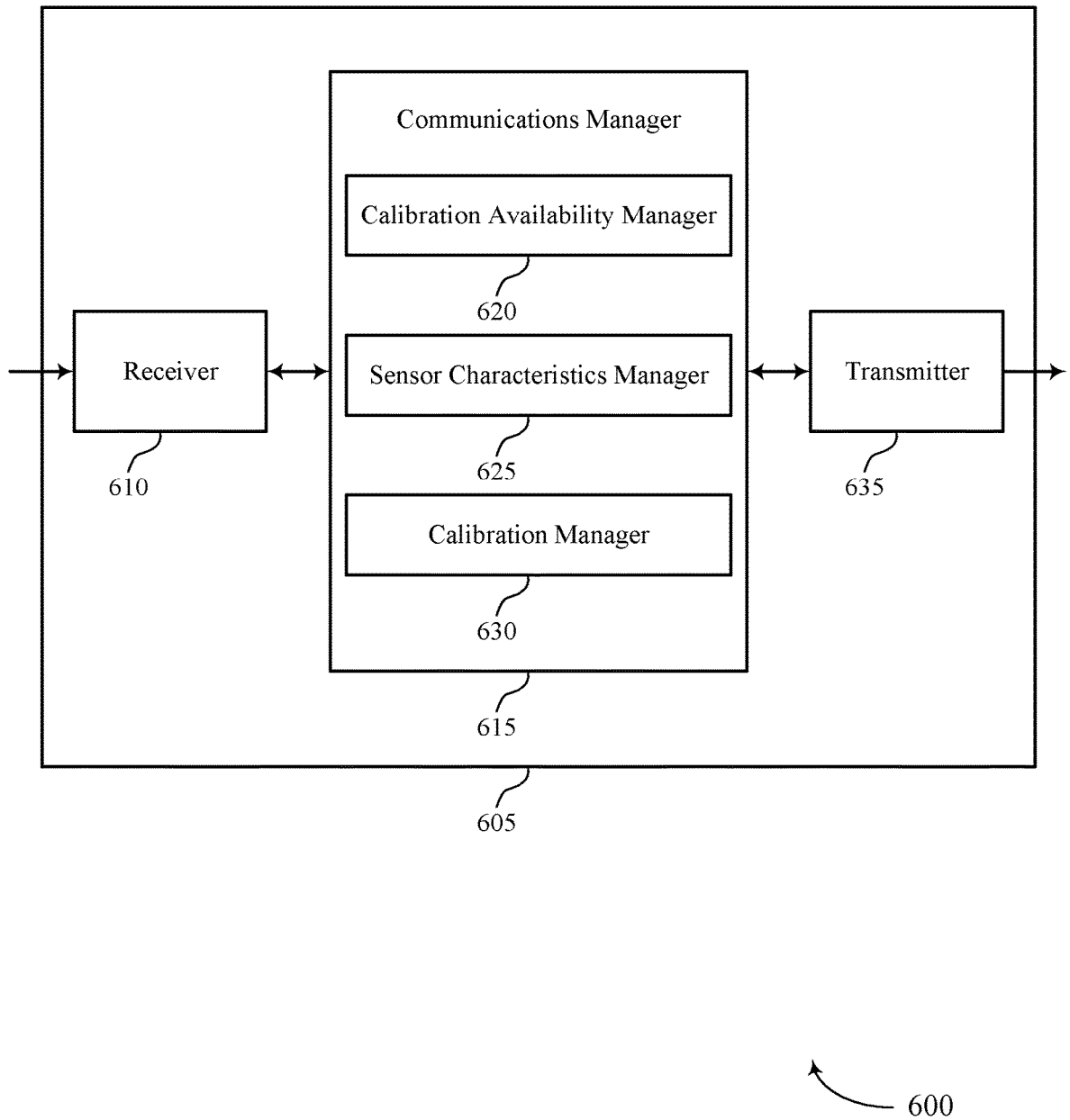

FIG. 6 shows a block diagram 600 of a device 605 that supports V2X assisted dynamic calibration of automotive sensors in accordance with aspects of the present disclosure. The device 605 may be an example of aspects of a device 505, a vehicle-based wireless device, and/or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to V2X assisted dynamic calibration of automotive sensors, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a calibration availability manager 620, a sensor characteristics manager 625, and a calibration manager 630. The communications manager 615 may be an example of aspects of the communications manager 810 described herein.

The calibration availability manager 620 may receive a calibration availability message from a roadside unit identifying one or more calibration characteristics of a calibration object associated with the roadside unit.

The sensor characteristics manager 625 may determine one or more sensor characteristics for a sensor of the vehicle and the vehicle.

The calibration manager 630 may measure the one or more calibration characteristics of the calibration object using the sensor while the vehicle is within a defined range of the calibration object and perform a calibration procedure to calibrate the sensor based on the identified one or more calibration characteristics, the measured one or more calibration characteristics, and the one or more sensor characteristics.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
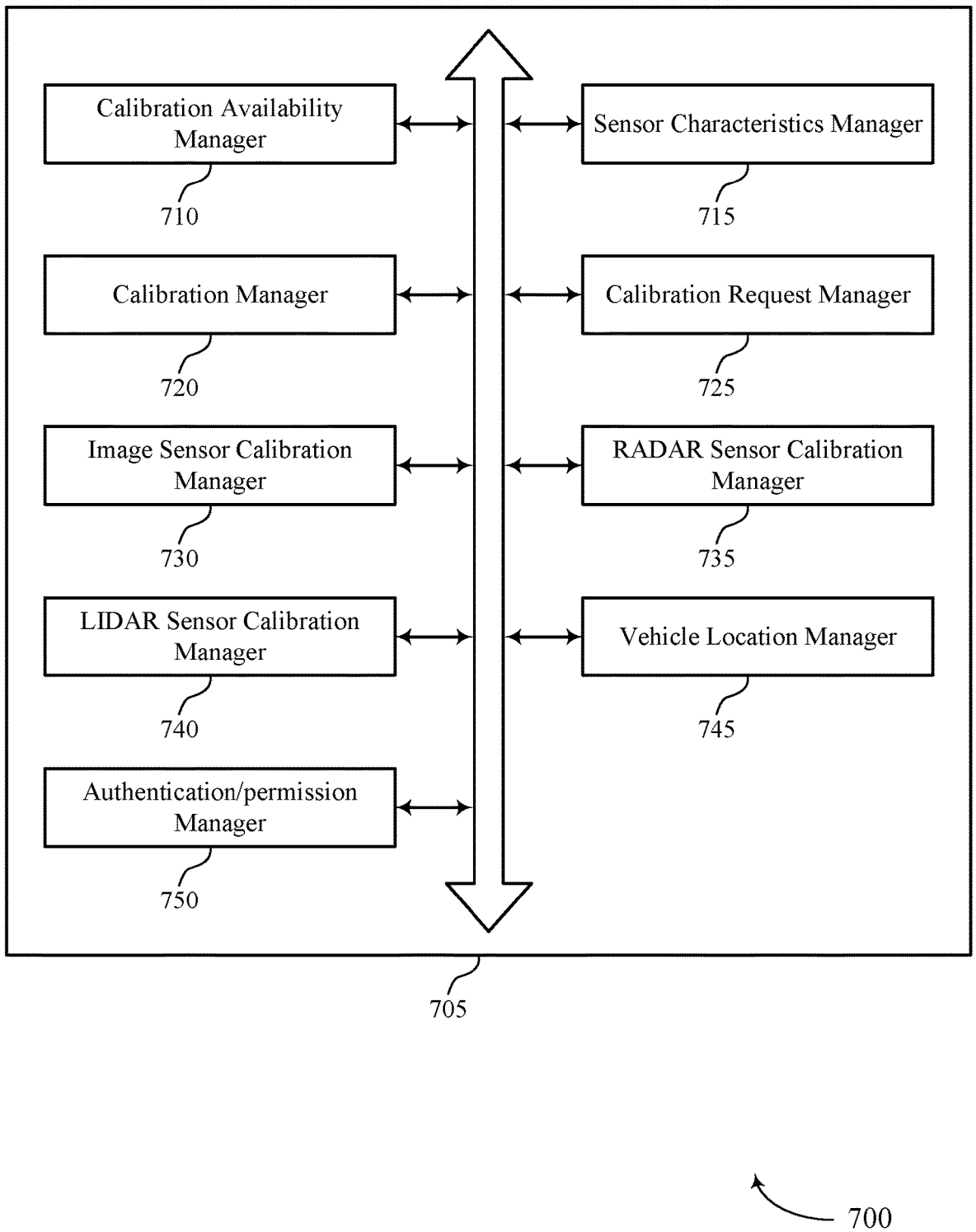
FIG. 7 shows a block diagram of a communications manager that supports V2X assisted dynamic calibration of automotive sensors in accordance with aspects of the present disclosure.

FIG. 7 shows a block diagram 700 of a communications manager 705 that supports V2X assisted dynamic calibration of automotive sensors in accordance with aspects of the present disclosure. The communications manager 705 may be an example of aspects of a communications manager 515, a communications manager 615, or a communications manager 810 described herein. The communications manager 705 may include a calibration availability manager 710, a sensor characteristics manager 715, a calibration manager 720, a calibration request manager 725, an image sensor calibration manager 730, a RADAR sensor calibration manager 735, a LIDAR sensor calibration manager 740, a vehicle location manager 745, and an authentication/permission manager 750. Each of these modules may communicate, directly or indirectly, with one another (e.g., via one or more buses).

The calibration availability manager 710 may receive a calibration availability message from a roadside unit identifying one or more calibration characteristics of a calibration object associated with the roadside unit. In some cases, the roadside unit includes at least one of a multi-purpose traffic light, or a traffic safety node, or a roadside communications node, or a base station, or a different vehicle, or a combination thereof.

In some cases, the calibration object includes at least one of a location marker, or an object having a defined shape, size, color, location, orientation, or movement profile, or an object displaying a defined image, or an object configured to transmit a responsive RADAR signal, or a combination thereof. In some cases, the calibration availability message includes at least one of a TIM, or a roadside message, or a combination thereof.

The sensor characteristics manager 715 may determine one or more sensor characteristics for a sensor of the vehicle and the vehicle. In some cases, the one or more calibration characteristics include at least one of a location, or a size, or a shape, or a visual image, or a 3D profile, or a combination thereof.

The calibration manager 720 may measure the one or more calibration characteristics of the calibration object using the sensor while the vehicle is within a defined range of the calibration object. In some examples, the calibration manager 720 may perform a calibration procedure to calibrate the sensor based on the identified one or more calibration characteristics, the measured one or more calibration characteristics, and the one or more sensor characteristics. In some examples, performing the calibration procedure using the calibration object includes a subscription-based service.

The calibration request manager 725 may transmit a calibration request message to the roadside unit identifying a type of calibration procedure to be performed. In some cases, the calibration request message includes a BSM.

The image sensor calibration manager 730 may read a visual display on the calibration object using the sensor, where the sensor includes an image sensor. In some examples, the image sensor calibration manager 730 may compare the visual display to the one or more sensor characteristics for the sensor. In some examples, the image sensor calibration manager 730 may calibrate the sensor based on the comparing. In some cases, the visual display includes at least one of an active visual display, a static visual display, or a combination thereof.

The RADAR sensor calibration manager 735 may transmit a RADAR signal to the calibration object, where the sensor includes a RF-based proximity and ranging sensor. In some examples, the RADAR sensor calibration manager 735 may receive, using the sensor, a response RADAR signal from the calibration object based on the RADAR signal. In some examples, the RADAR sensor calibration manager 735 may calibrate the sensor based on the response RADAR signal.

The LIDAR sensor calibration manager 740 may transmit a LIDAR signal to the calibration object, where the sensor includes a light-based proximity and ranging sensor. In some examples, the LIDAR sensor calibration manager 740 may identify, using the sensor, a 3D profile of the calibration object based on a LIDAR signal reflected from the calibration object. In some examples, the LIDAR sensor calibration manager 740 may calibrate the sensor based on the 3D profile.

The vehicle location manager 745 may determine, based on a location of the vehicle, that the vehicle is within the defined range of the calibration object.

The authentication/permission manager 750 may perform an authentication procedure with the roadside unit based on the calibration availability message and prior to performing the calibration procedure. In some examples, the authentication/permission manager 750 may verify, based at least in part on the authentication procedure, that the vehicle is permitted to perform the calibration procedure.

Figure 8:
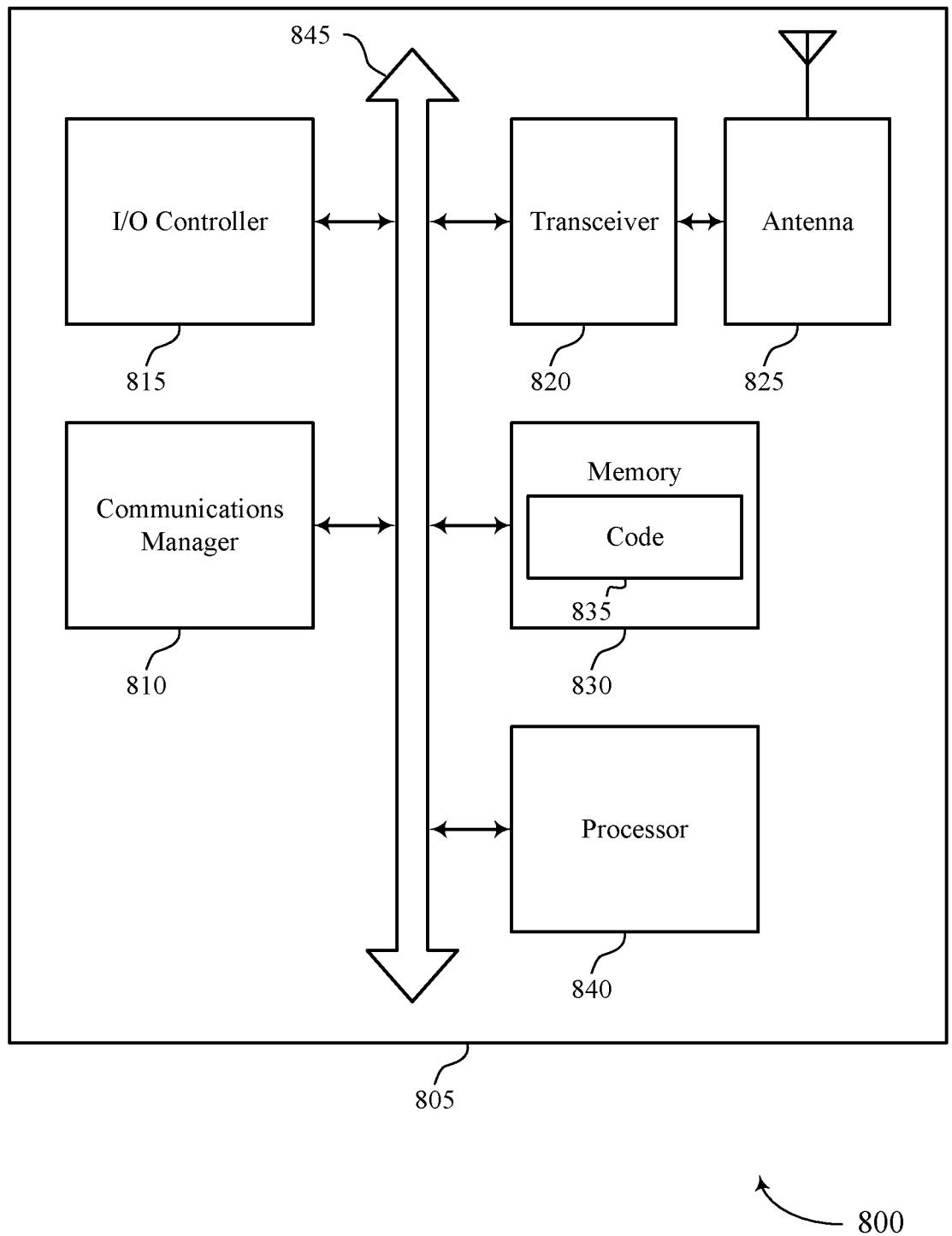
FIG. 8 shows a diagram of a system including a device that supports V2X assisted dynamic calibration of automotive sensors in accordance with aspects of the present disclosure.

FIG. 8 shows a diagram of a system 800 including a device 805 that supports V2X assisted dynamic calibration of automotive sensors in accordance with aspects of the present disclosure. The device 805 may be an example of or include the components of device 505, device 605, a UE 115, and/or a vehicle-based wireless device as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a calibration availability message from a roadside unit identifying one or more calibration characteristics of a calibration object associated with the roadside unit, determine one or more sensor characteristics for a sensor of the vehicle and the vehicle, measure the one or more calibration characteristics of the calibration object using the sensor while the vehicle is within a defined range of the calibration object, and perform a calibration procedure to calibrate the sensor based on the identified one or more calibration characteristics, the measured one or more calibration characteristics, and the one or more sensor characteristics.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting V2X assisted dynamic calibration of automotive sensors).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
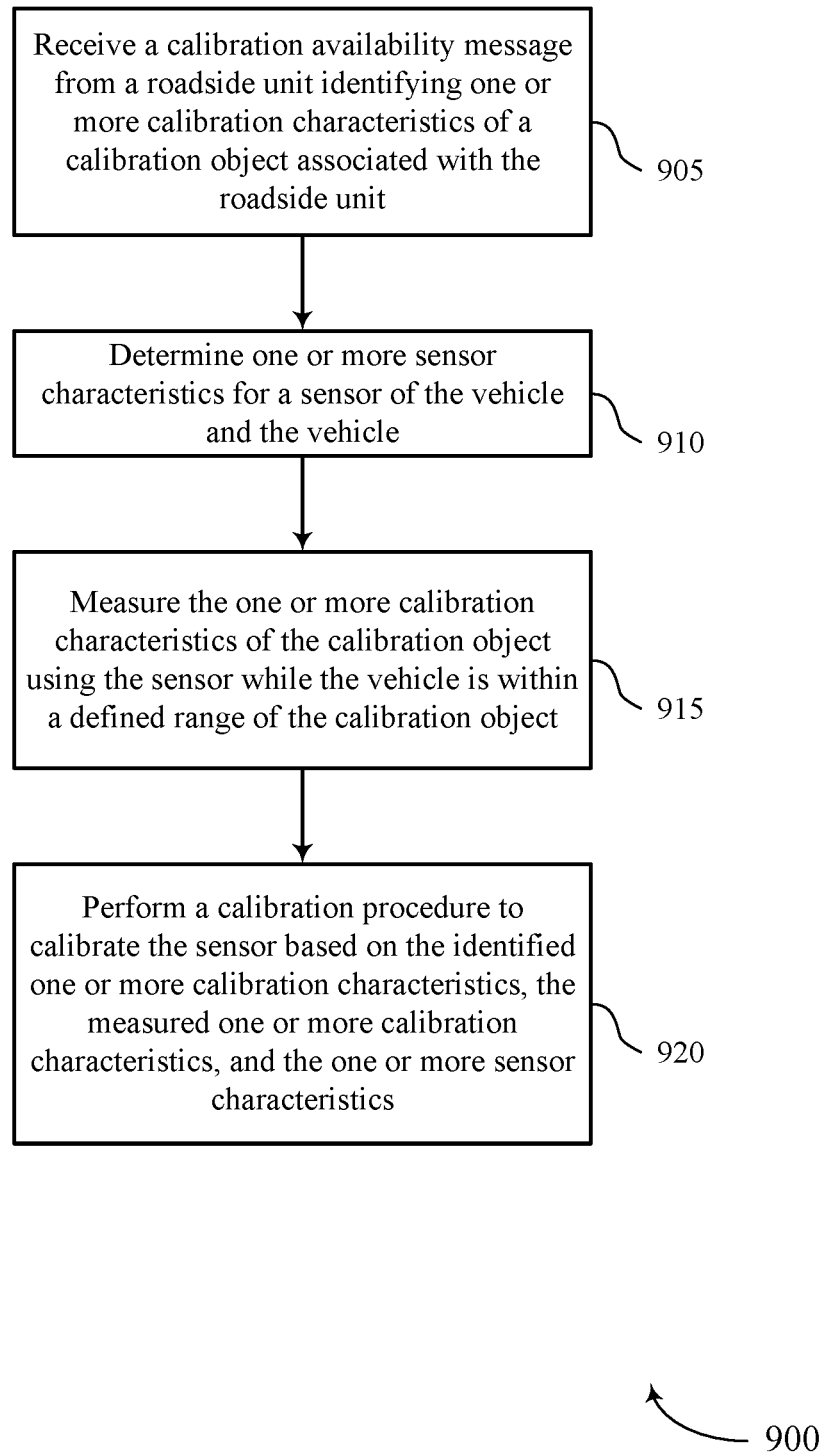
FIGS. 9 through 11 show flowcharts illustrating methods that support V2X assisted dynamic calibration of automotive sensors in accordance with aspects of the present disclosure.

FIG. 9 shows a flowchart illustrating a method 900 that supports V2X assisted dynamic calibration of automotive sensors in accordance with aspects of the present disclosure. The operations of method 900 may be implemented by a device (such as a vehicle-based wireless device) or its components as described herein. For example, the operations of method 900 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may receive a calibration availability message from a roadside unit identifying one or more calibration characteristics of a calibration object associated with the roadside unit. The operations of 905 may be performed according to the methods described herein. In some examples, aspects of the operations of 905 may be performed by a calibration availability manager as described with reference to FIGS. 5 through 8.

At 910, the device may determine one or more sensor characteristics for a sensor of the vehicle and the vehicle. The operations of 910 may be performed according to the methods described herein. In some examples, aspects of the operations of 910 may be performed by a sensor characteristics manager as described with reference to FIGS. 5 through 8.

At 915, the device may measure the one or more calibration characteristics of the calibration object using the sensor while the vehicle is within a defined range of the calibration object. The operations of 915 may be performed according to the methods described herein. In some examples, aspects of the operations of 915 may be performed by a calibration manager as described with reference to FIGS. 5 through 8.

At 920, the device may perform a calibration procedure to calibrate the sensor based on the identified one or more calibration characteristics, the measured one or more calibration characteristics, and the one or more sensor characteristics. The operations of 920 may be performed according to the methods described herein. In some examples, aspects of the operations of 920 may be performed by a calibration manager as described with reference to FIGS. 5 through 8.

Figure 10:
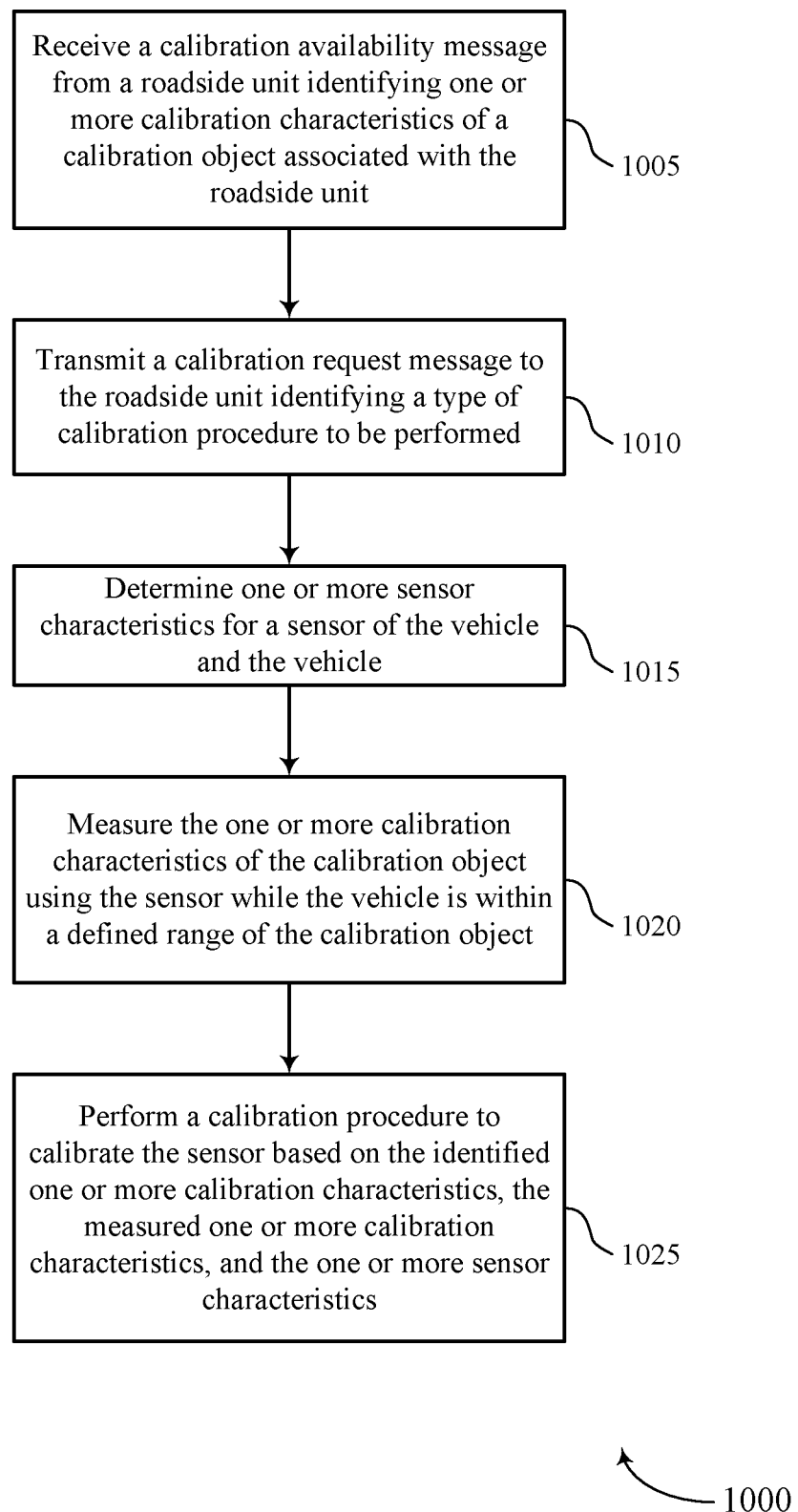

FIG. 10 shows a flowchart illustrating a method 1000 that supports V2X assisted dynamic calibration of automotive sensors in accordance with aspects of the present disclosure. The operations of method 1000 may be implemented by a device (such as a vehicle-based wireless device) or its components as described herein. For example, the operations of method 1000 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may receive a calibration availability message from a roadside unit identifying one or more calibration characteristics of a calibration object associated with the roadside unit. The operations of 1005 may be performed according to the methods described herein. In some examples, aspects of the operations of 1005 may be performed by a calibration availability manager as described with reference to FIGS. 5 through 8.

At 1010, the device may transmit a calibration request message to the roadside unit identifying a type of calibration procedure to be performed. The operations of 1010 may be performed according to the methods described herein. In some examples, aspects of the operations of 1010 may be performed by a calibration request manager as described with reference to FIGS. 5 through 8.

At 1015, the device may determine one or more sensor characteristics for a sensor of the vehicle and the vehicle. The operations of 1015 may be performed according to the methods described herein. In some examples, aspects of the operations of 1015 may be performed by a sensor characteristics manager as described with reference to FIGS. 5 through 8.

At 1020, the device may measure the one or more calibration characteristics of the calibration object using the sensor while the vehicle is within a defined range of the calibration object. The operations of 1020 may be performed according to the methods described herein. In some examples, aspects of the operations of 1020 may be performed by a calibration manager as described with reference to FIGS. 5 through 8.

At 1025, the device may perform a calibration procedure to calibrate the sensor based on the identified one or more calibration characteristics, the measured one or more calibration characteristics, and the one or more sensor characteristics. The operations of 1025 may be performed according to the methods described herein. In some examples, aspects of the operations of 1025 may be performed by a calibration manager as described with reference to FIGS. 5 through 8.

Figure 11:
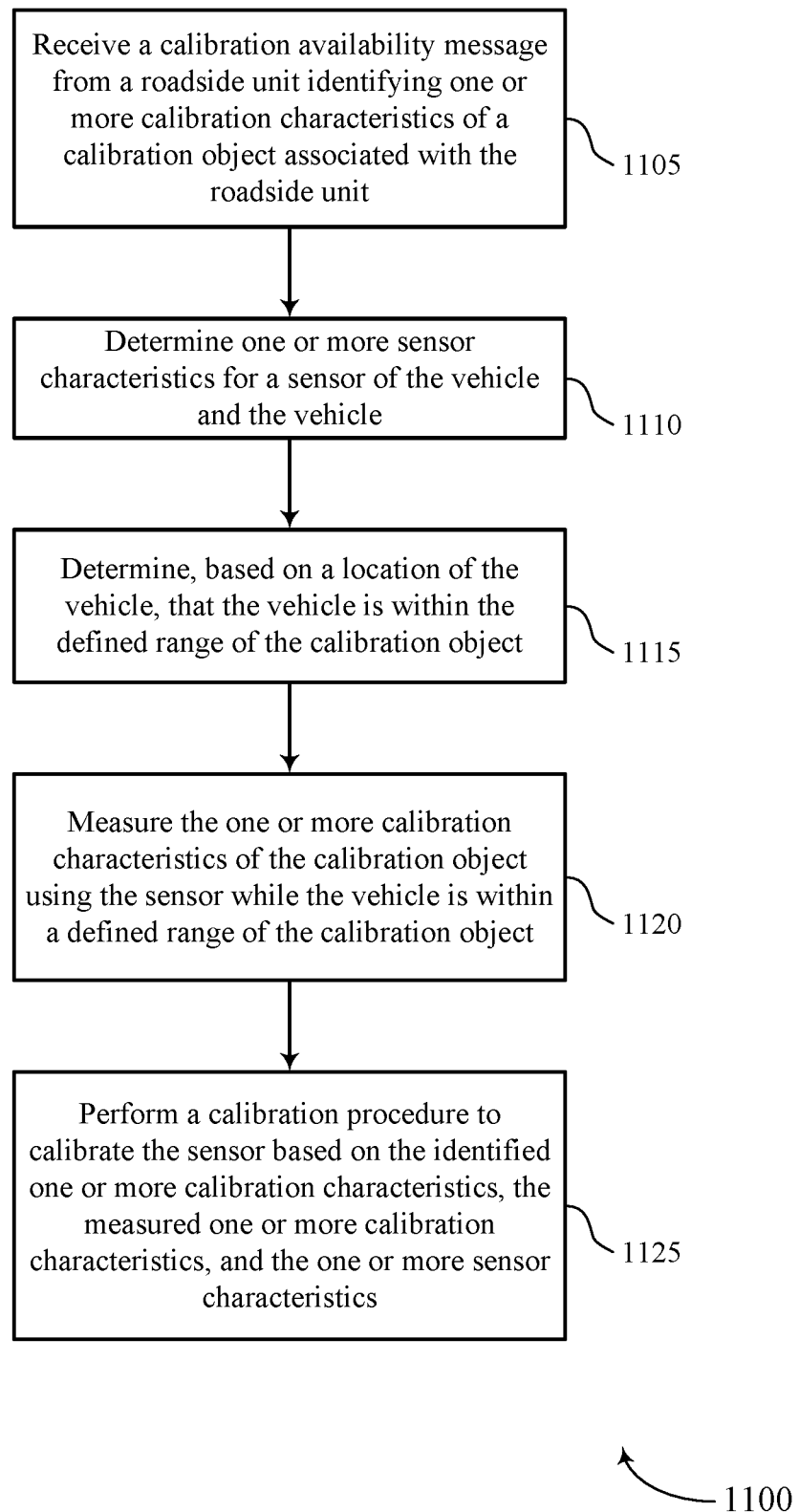

FIG. 11 shows a flowchart illustrating a method 1100 that supports V2X assisted dynamic calibration of automotive sensors in accordance with aspects of the present disclosure. The operations of method 1100 may be implemented by a device (such as a vehicle based wireless device) or its components as described herein. For example, the operations of method 1100 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1105, the device may receive a calibration availability message from a roadside unit identifying one or more calibration characteristics of a calibration object associated with the roadside unit. The operations of 1105 may be performed according to the methods described herein. In some examples, aspects of the operations of 1105 may be performed by a calibration availability manager as described with reference to FIGS. 5 through 8.

At 1110, the device may determine one or more sensor characteristics for a sensor of the vehicle and the vehicle. The operations of 1110 may be performed according to the methods described herein. In some examples, aspects of the operations of 1110 may be performed by a sensor characteristics manager as described with reference to FIGS. 5 through 8.

At 1115, the device may determine, based on a location of the vehicle, that the vehicle is within the defined range of the calibration object. The operations of 1115 may be performed according to the methods described herein. In some examples, aspects of the operations of 1115 may be performed by a vehicle location manager as described with reference to FIGS. 5 through 8.

At 1120, the device may measure the one or more calibration characteristics of the calibration object using the sensor while the vehicle is within a defined range of the calibration object. The operations of 1120 may be performed according to the methods described herein. In some examples, aspects of the operations of 1120 may be performed by a calibration manager as described with reference to FIGS. 5 through 8.

At 1125, the device may perform a calibration procedure to calibrate the sensor based on the identified one or more calibration characteristics, the measured one or more calibration characteristics, and the one or more sensor characteristics. The operations of 1125 may be performed according to the methods described herein. In some examples, aspects of the operations of 1125 may be performed by a calibration manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing at a vehicle-based wireless device, comprising:
   receiving a calibration availability message from a roadside unit identifying one or more calibration characteristics of a calibration object associated with the roadside unit;
   determining one or more sensor characteristics for a sensor of a vehicle and the vehicle;
   measuring the one or more calibration characteristics of the calibration object using the sensor while the vehicle is within a defined range of the calibration object; and
   performing a calibration procedure to calibrate the sensor based at least in part on the identified one or more calibration characteristics, the measured one or more calibration characteristics, and the one or more sensor characteristics.

2. The method of claim 1, further comprising:
   transmitting a calibration request message to the roadside unit identifying a type of calibration procedure to be performed.

3. The method of claim 2, wherein the calibration request message comprises a basic safety message (BSM).

4. The method of claim 1, wherein performing the calibration procedure comprises:
   reading a visual display on the calibration object using the sensor, wherein the sensor comprises an image sensor;
   comparing the visual display to the one or more sensor characteristics for the sensor; and
   calibrating the sensor based at least in part on the comparing.

5. The method of claim 4, wherein the visual display comprises at least one of an active visual display, a static visual display, or a combination thereof.

6. The method of claim 1, wherein performing the calibration procedure comprises:
   transmitting a radio detection and ranging (RADAR) signal to the calibration object, wherein the sensor comprises a radio frequency (RF)-based proximity and ranging sensor;
   receiving, using the sensor, a response RADAR signal from the calibration object based at least in part on the RADAR signal; and
   calibrating the sensor based at least in part on the response RADAR signal.

7. The method of claim 1, wherein performing the calibration procedure comprises:
   transmitting a light detection and ranging (LIDAR) signal to the calibration object, wherein the sensor comprises a light-based proximity and ranging sensor;
   identifying, using the sensor, a three-dimensional (3D) profile of the calibration object based at least in part on a LIDAR signal reflected from the calibration object; and
   calibrating the sensor based at least in part on the 3D profile.

8. The method of claim 1, further comprising:
   determining, based at least in part on a location of the vehicle, that the vehicle is within the defined range of the calibration object.

9. The method of claim 1, further comprising:
   performing an authentication procedure with the roadside unit based at least in part on the calibration availability message and prior to performing the calibration procedure; and
   verifying, based at least in part on the authentication procedure, that the vehicle is permitted to perform the calibration procedure.

10. The method of claim 1, wherein the roadside unit comprises at least one of a multi-purpose traffic light, or a traffic safety node, or a roadside communications node, or a base station, or a different vehicle, or a combination thereof.

11. The method of claim 1, wherein the calibration object comprises at least one of a location marker, or an object having a defined shape, size, color, location, orientation, or movement profile, or an object displaying a defined image, or an object configured to transmit a responsive radio detection and ranging (RADAR) signal, or a combination thereof.

12. The method of claim 1, wherein the one or more calibration characteristics comprise at least one of a location, or a size, or a shape, or a visual image, or a three dimensional (3D) profile, or a combination thereof.

13. The method of claim 1, wherein the calibration availability message comprises at least one of a traveler information message (TIM), or a roadside message, or a combination thereof.

14. The method of claim 1, wherein:
performing the calibration procedure using the calibration object comprises a subscription-based service.

15. An apparatus for image processing at a vehicle-based wireless device, comprising:
a processor,
memory coupled with the processor; and
instructions stored in the memory and executable by the processor to cause the apparatus to:
receive a calibration availability message from a roadside unit identifying one or more calibration characteristics of a calibration object associated with the roadside unit;
determine one or more sensor characteristics for a sensor of a vehicle and the vehicle;
measure the one or more calibration characteristics of the calibration object using the sensor while the vehicle is within a defined range of the calibration object; and
perform a calibration procedure to calibrate the sensor based at least in part on the identified one or more calibration characteristics, the measured one or more calibration characteristics, and the one or more sensor characteristics.

16. The apparatus of claim 15, wherein the instructions are further executable by the processor to cause the apparatus to:
transmit a calibration request message to the roadside unit identifying a type of calibration procedure to be performed.

17. The apparatus of claim 16, wherein the calibration request message comprises a basic safety message (BSM).

18. The apparatus of claim 15, wherein the instructions to perform the calibration procedure are executable by the processor to cause the apparatus to:
read a visual display on the calibration object using the sensor, wherein the sensor comprises an image sensor;
compare the visual display to the one or more sensor characteristics for the sensor; and
calibrate the sensor based at least in part on the comparing.

19. The apparatus of claim 18, wherein the visual display comprises at least one of an active visual display, a static visual display, or a combination thereof.

20. An apparatus for image processing at a vehicle-based wireless device, comprising:
a transceiver for receiving a calibration availability message from a roadside unit identifying one or more calibration characteristics of a calibration object associated with the roadside unit;
a processor for determining one or more sensor characteristics for a sensor of the vehicle and the vehicle;
the sensor for measuring the one or more calibration characteristics of the calibration object using the sensor while the vehicle is within a defined range of the calibration object; and
the processor for performing a calibration procedure to calibrate the sensor based at least in part on the identified one or more calibration characteristics, the measured one or more calibration characteristics, and the one or more sensor characteristics.

* * * * *